July 4, 1967

J. E. HEIDER ETAL 3,329,752

METHOD FOR MAKING PLASTIC ARTICLES

Filed Oct. 7, 1963

INVENTORS
JAMES E. HEIDER
CHARLES E. PLYMALE
BY
ATTORNEYS

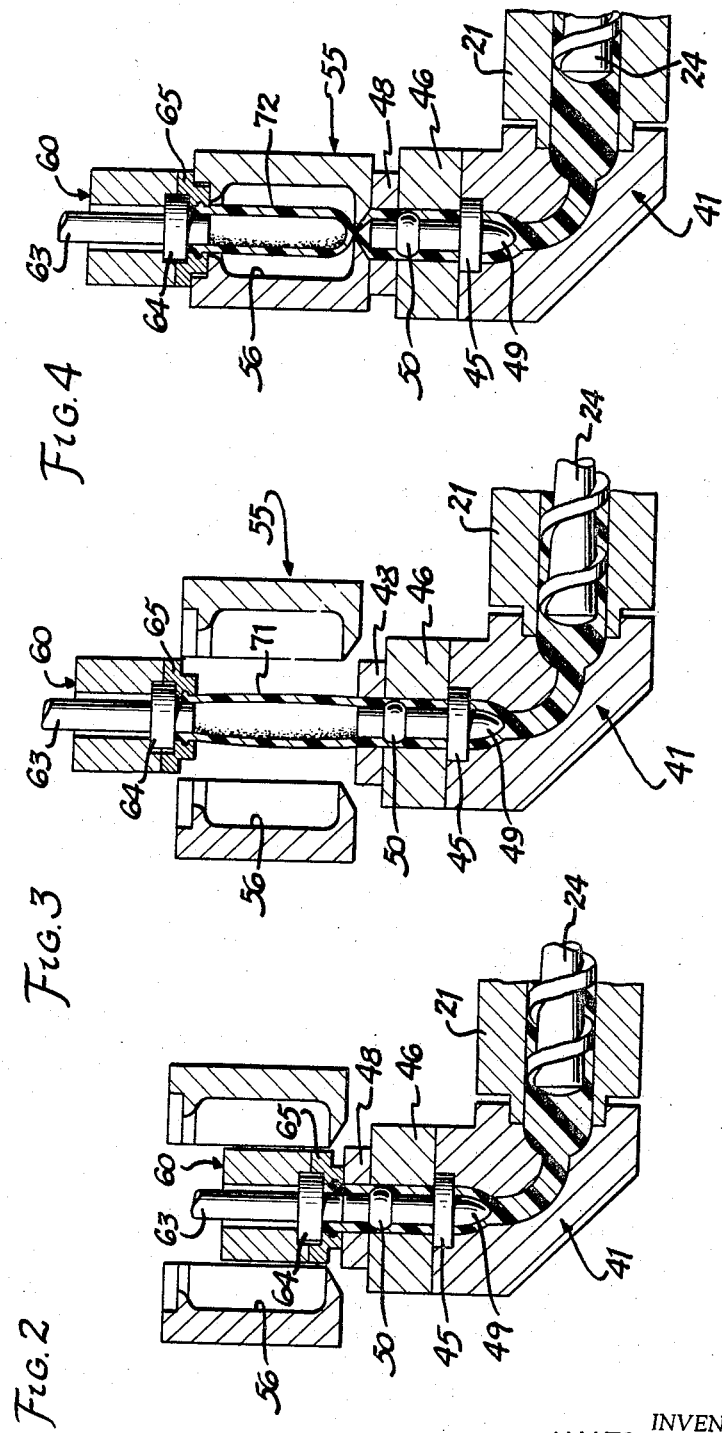

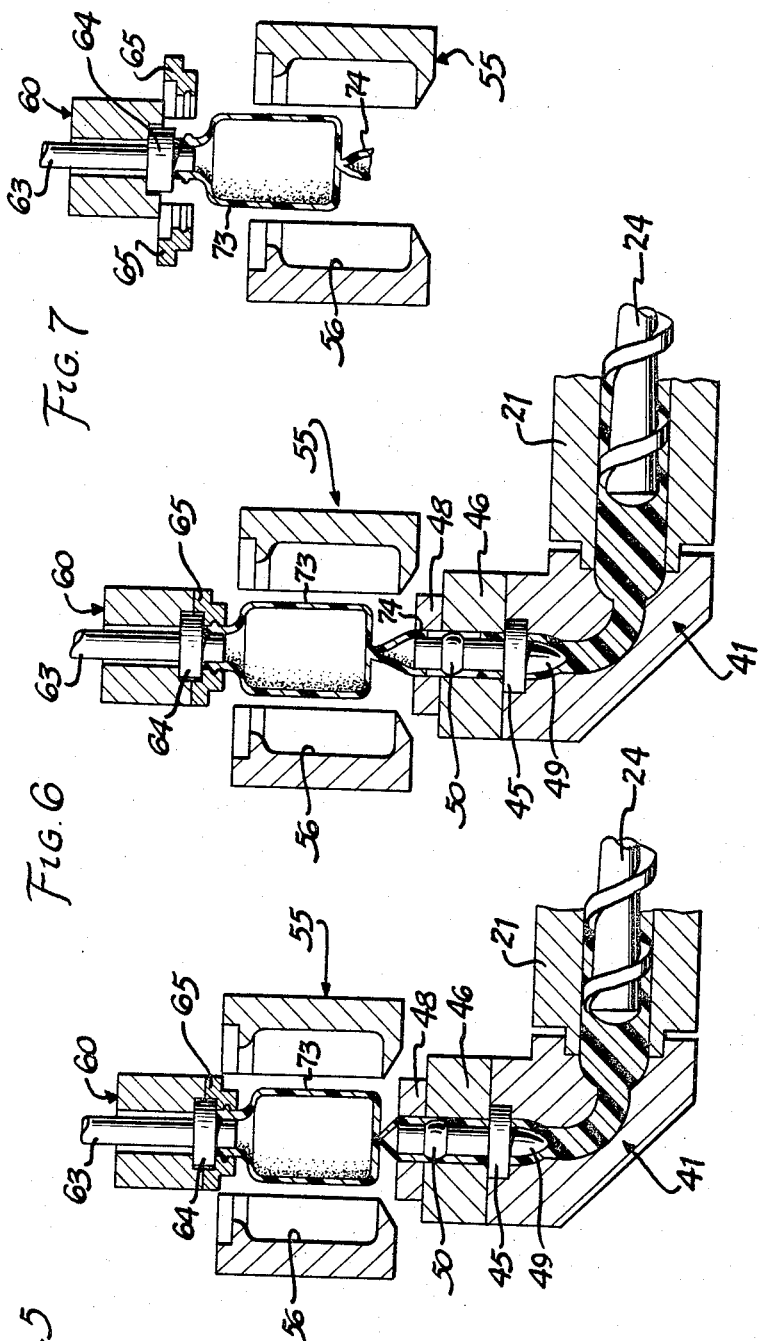

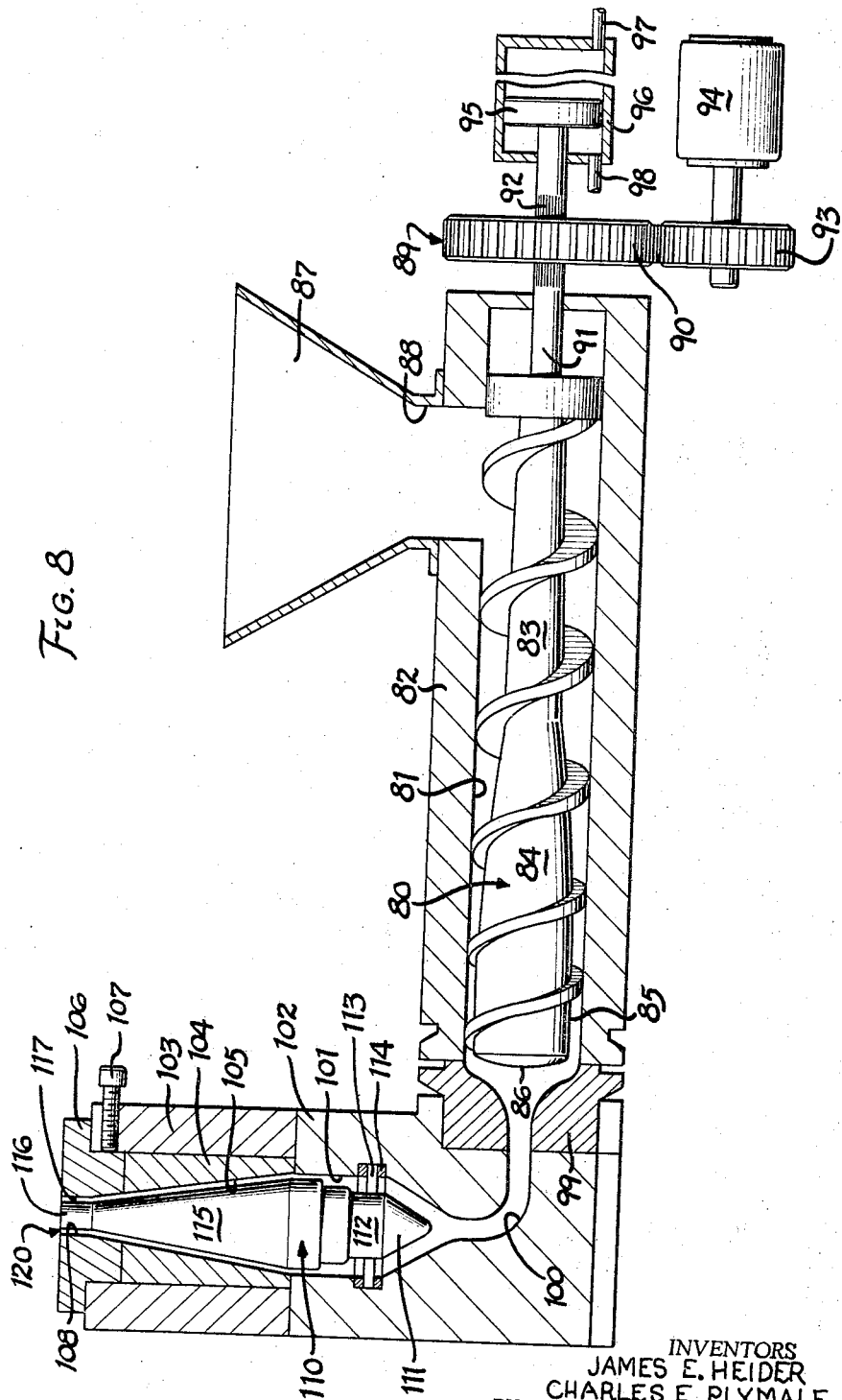

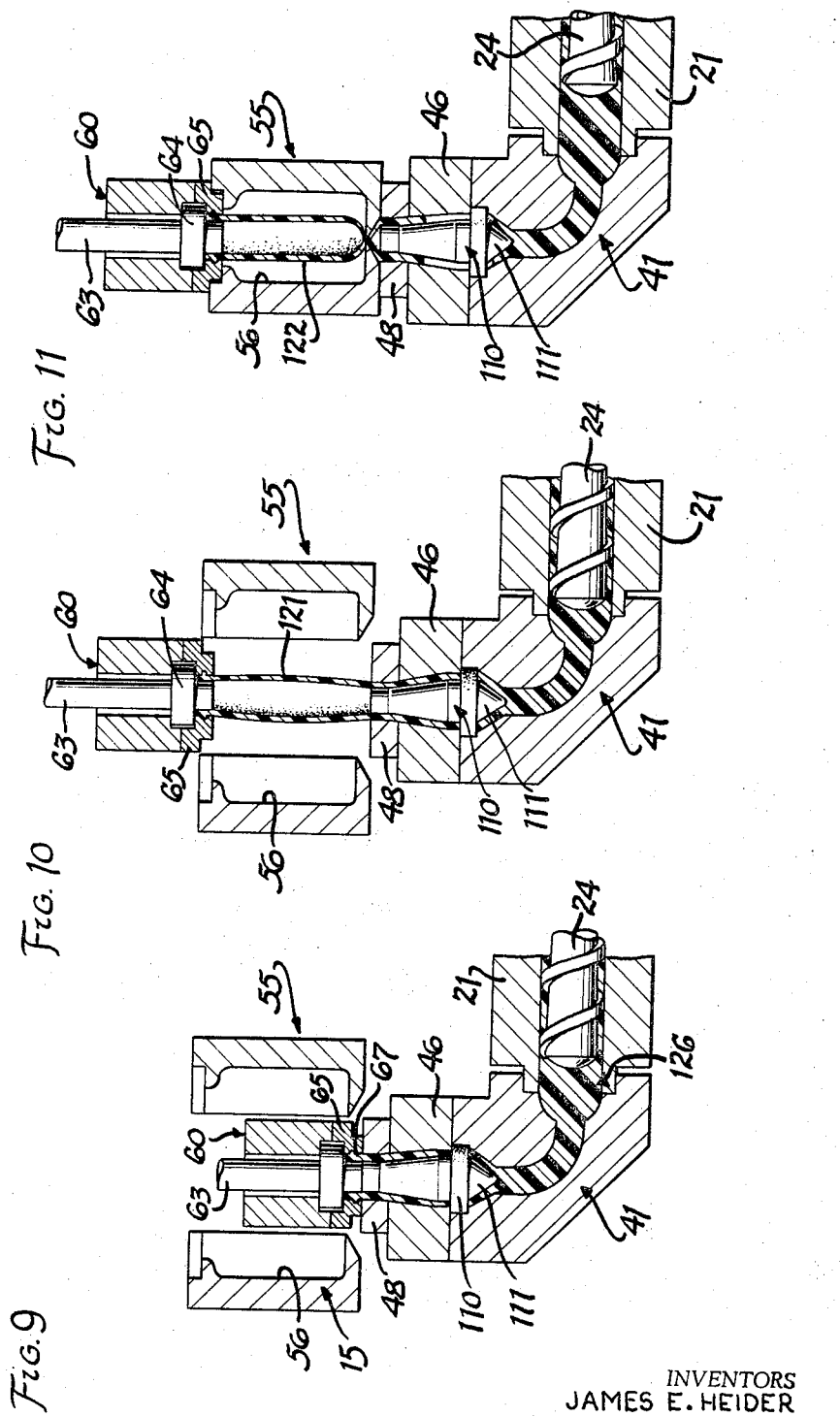

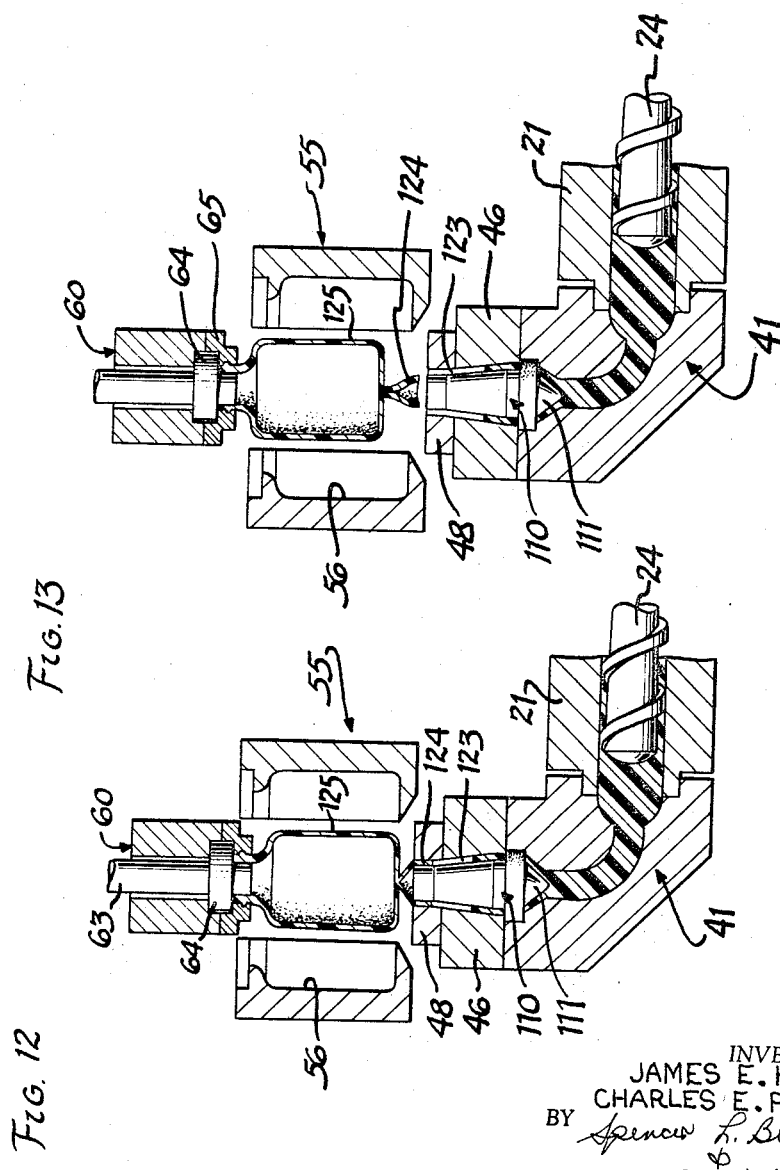

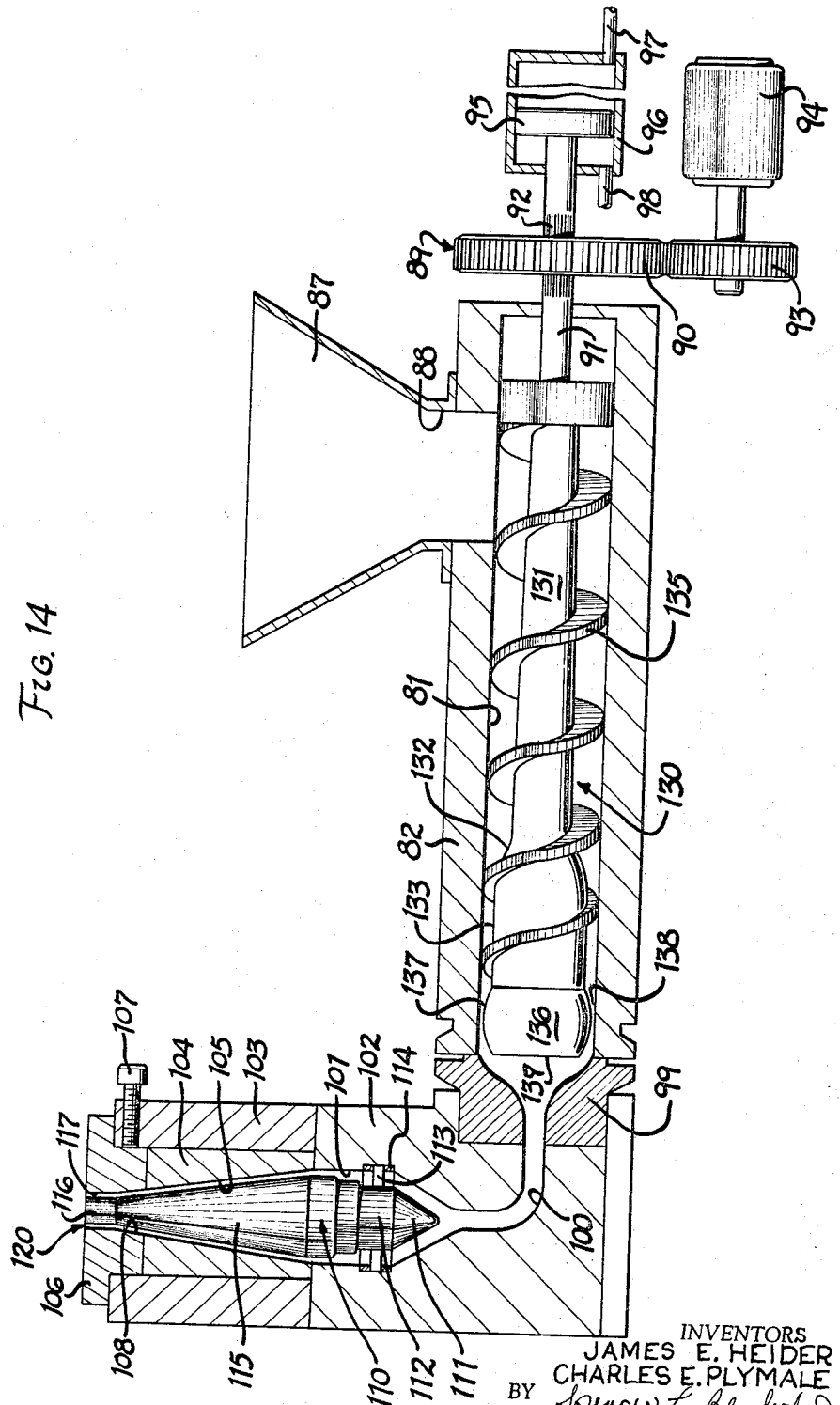

United States Patent Office 3,329,752
Patented July 4, 1967

3,329,752
METHOD FOR MAKING PLASTIC ARTICLES
James E. Heider, Toledo, and Charles E. Plymale, Maumee, Ohio, assignors to Owens-Illinois, Inc., a corporation of Ohio
Filed Oct. 7, 1963, Ser. No. 314,126
3 Claims. (Cl. 264—97)

The present invention relates to a method of and apparatus for making plastic articles. More particularly, the present invention relates to a method of and apparatus for making an article from heat-sensitive thermoplastic material by forming operations performed exteriorly of a forming orifice, the heat-sensitive material being supplied to the orifice and dispensed therethrough under conditions preventing heat degradation thereof.

In the manufacture of articles from thermoplastic materials, several well known manufacturing techniques, i.e., injection molding, extrusion and blow molding, or combinations of these techniques, have been utilized in the past. For example, in the manufacture of containers a commonly utilized method includes the extrusion of a freely pendant tube, the enclosure of the tube in a blow mold and the blowing of the tube exteriorly of the mold. Additionally, an injection molding operation to form a neck, followed by the extrusion of a tube, and then blowing of the tube to a final configuration, has been proposed for the manufacture of containers, as in United States Letters Patent No. 3,008,192, granted Nov. 14, 1961. Such methods are commonly used in the manufacture of blown articles from heat stable thermoplastic materials, such as polyethylene.

Such forming techniques generally are not acceptable, or even workable, in the manufacture of articles from heat sensitive thermoplastic materials which are generally more rigid, or "harder," than polyethylene, e.g. polyvinyl chloride polymers, co-polymers of polyvinyl chloride and polyvinyl acetate, polymerized formaldehyde resins or "acetal" resins, or polyvinylidene chloride resins. These materials are more rigid than polyethylene or polypropylene, thus rendering difficult the separation of "neck flash" or waste portions inherently formed at the neck of a container when the container is formed by blow molding a freely pendant extruded tube. After the separation of the flash, a noticeable "scar" remains which interferes with the neck thread and which differs visually from the remainder of the container.

Further, such resins, when in a plasticized state, are extremely heat sensitive and thermally degrade, usually into volatile products, if they are maintained at an elevated temperature for an appreciable period, as is necessary in intermittent forming operations, such as proposed in the above-identified Patent No. 3,008,192.

Any attempt to control the intermittent issuance of such materials through an orifice by means of a shut off valve or other obstruction in the extrusion path will result in thermal degradation, and the formation of an unsuitable product, even if the volatile thermal breakdown products do not explode.

All in all, the formation of suitable blow molded articles from such heat sensitive, thermoplastic materials has posed a substantial problem for the art. The present invention now proposes a new and novel concept in utilizing such heat sensitive thermoplastic material in a plastic forming operation, typically a blow molding operation, performed exteriorly of a forming orifice.

Basically, the present invention proposes a method of and apparatus for accumulating a body of plasticized heat sensitive material in full communication with a forming orifice and subjecting the so accumulated body of such heat sensitive material, to a pressure sufficient to displace through the orifice that quantity of material necessary for the desired forming operation. By so accumulating the material, the necessity for providing a shut off valve or the like is eliminated, and the likelihood of thermal degradation of the heat sensitive material is substantially lessened. Additionally, by so accumulating the material, the accumulated material is dispensed through the orifice on a "first in-first out" basis, again reducing the likelihood of thermal degradation. Further, such an operation permits the intermittent issuance of plasticized material, and thus makes possible a combined injection molding, extrusion and blow molding operation to provide a container free of "neck flash."

A preferred apparatus for accommodating the accumulation of heat sensitive material in the manner above described includes a reciprocating screw-type plasticizer extruder, the plasticizing screw being locatable in a tubular barrel communicating with the forming orifice to provide a body of plasticized material intermediate the outlet into the screw and the forming orifice.

To accumulate the body of material in communication with the orifice but without being expressed through the orifice, a restriction may be interposed between the body of material and the orifice, the restriction being capable of causing a pressure drop thereacross in excess of the pressure at which the body is accumulated by the screw. Thus, mere rotation of the screw will not displace material through the orifice but will accumulate a body of material for subsequent displacement. The actual displacement of material through the orifice is effected by actuating the screw axially toward the orifice to subject the material to a pressure in excess of that generated by the screw rotation.

Alternatively, the screw may be mechanically displaced away from the orifice to space the outlet end of the screw from the orifice to provide a void between the outlet end of the screw and the orifice, this void having a volume in excess of the volume of material to be accumulated prior to the next issuance of material. The screw is substantially displaced toward the orifice to advance the material previously accumulated through any remaining unfilled space and, finally, through the orifice itself.

It is, therefore, an important object of the present invention to provide a new and novel method for making an article from heat sensitive thermoplastic material by a forming operation performed exteriorly of a forming orifice.

Another important object of the present invention is to provide an apparatus and method for making an article from heat sensitive thermoplastic materials by dispensing through an orifice heat sensitive plasticized material which has been previously accumulated in full communication with the orifice.

It is a further object of the present invention to provide a method for plasticizing heat sensitive thermoplastic material and providing a body of such material to be dispensed through a forming orifice for a subsequent forming operation performed exteriorly of the orifice, and including the ultilization of an axially displaceable, rotatable plasticizing screw disposed within an enclosing barrel communicating freely with the orifice, the screw being rotatable to accumulate the body of plasticized material and being axially displaceable toward the orifice to dispense the accumulated material therethrough, the body of plasticized material being in constant communication with the orifice.

Yet another, and no less important, object of the present invention is the provision of a method for a performance of an intermittent blow molding operation exteriorly of a forming orifice to which plasticized material is supapplied from an accumulated body of such plasticized material, which is always in communication with the orifice and which is accumulated and dispensed therethrough by means of a reciprocating plasticizer-extruder screw.

Other and further objects of this invention will appear in the following description and appended claims, reference being had to the accompanying drawings forming a part of this specification, wherein like reference characters designate corresponding parts in the several views.

On the drawings:

FIGURES 2 through 7 are successive fragmentary schematic illustrations of the apparatus of FIGURE 1, carrying out the steps of one embodiment of the method of the present invention;

FIGURE 8 is a view similar to FIGURE 1, but illustrating a different form of the same basic apparatus, capable of carrying out a modified method of the present invention;

FIGURES 9 through 13 are successive fragmentary schematic representations of the apparatus of FIGURE 1, carrying out the steps of a modified method of the present invention;

FIGURE 14 is a third form of apparatus also capable of carrying out the methods of the present invention.

As shown on the drawings:

Figure 1:
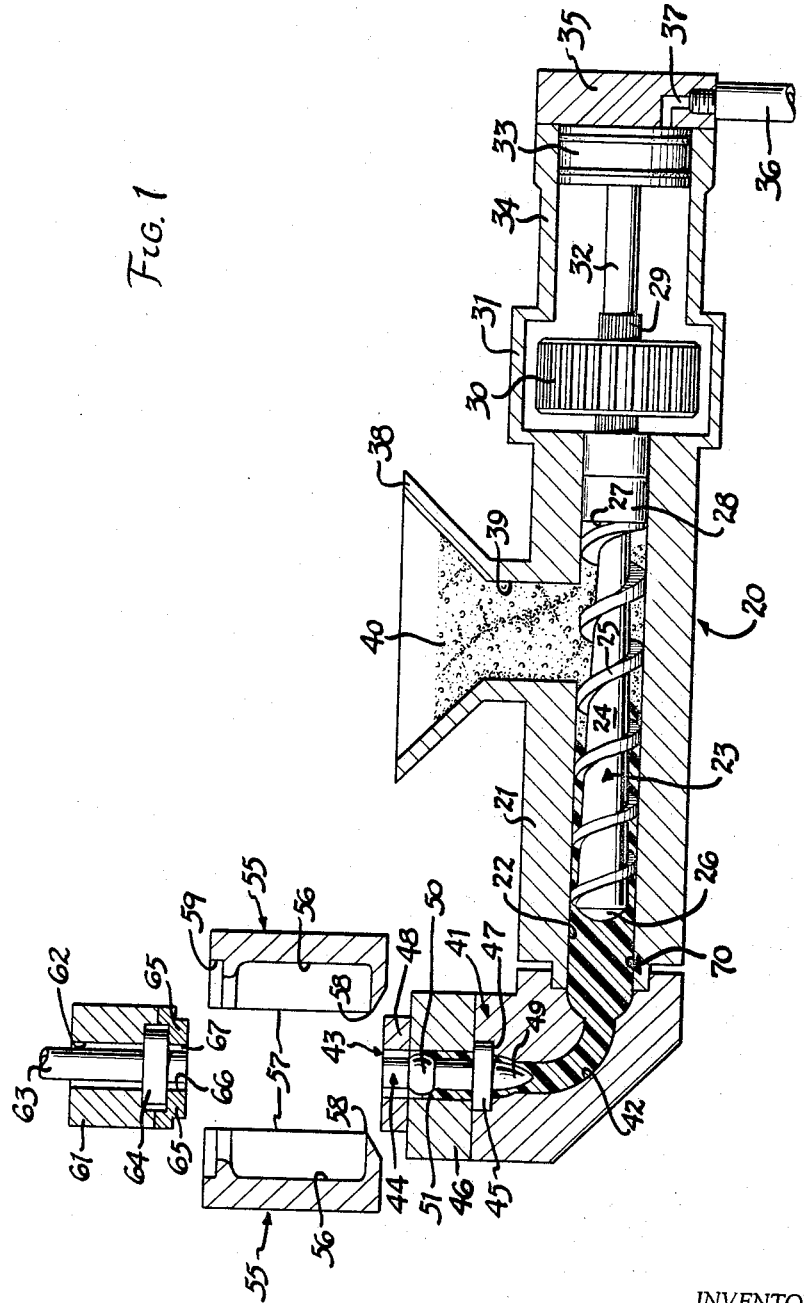
FIGURE 1 is a schematic representation of an axially displaceable, rotatable plasticizer-extruder mechanism for supplying heat sensitive plasticized material to a forming orifice in accordance with the method of the present invention.

In FIGURE 1, reference numeral 20 refers generally to one form of apparatus of the present invention.

This apparatus 20 includes a generally tubular extruder barrel 21 having a generally cylindrical axial bore 22 therein and in which an extruder screw 23 is disposed. As is conventional in such apparatus, heat is supplied to the barrel 21 by peripheral heaters (not shown).

This extruder screw 23 comprises an axially elongated, generally conical root portion 24 circumscribed by a helical screw flight 25. The root portion 24 of the screw decreases in exterior diameter from a generally rounded, bulbous forward nose portion 26 to a rear or base portion 27 secured to a cylindrical blocking portion 28 snugly fitting within the tube bore 22.

The base portion 27 has secured thereto or integrally formed therewith a splined extension 29 on which is disposed a drive gear 30 enclosed within a gear housing extension 31 of the barrel 21. This gear 30 is driven by an appropriate change speed gear mechanism (not shown) effective to rotate the screw 23 at a desired rate of speed. The gear 30 is axially fixed in position and the driving of the screw 23 thereby at various adjusted axial positions of the screw is accommodated by the splines 29.

Also integral with or connected to the splined extension 29 is a rearwardly projecting extension 32 having secured thereto an actuating piston 33 snugly confined within a cylindrical housing 34 forming an extension of the gear housing 31. The housing 34 is closed by a rear plate 35 adapted to receive fluid under pressure, as from a conduit 36 communicating through a passage 37 with the rear face of the piston 33. An upper supply hopper 38 communicates through a gravity supply passage 39 with the bore 22 of the barrel 21 to supply pelletized or other particulate thermoplastic material 40 to the barrel bore. The plasticizer-extruder thus provided is similar to that disclosed in the pending application of Hans G. Stenger, Ser. No. 185,756, filed Apr. 6, 1962, and assigned to the assignee of the present invention.

The barrel 22, at its outlet end, abuts an orifice block indicated generally at 41 and having therein a plasticized material supply channel 42 communicating freely with the bore 22, the curvature of the channel 42 being such that it serves to interconnect the horizontal barrel bore with a vertical, upwardly opening, annular orifice 43.

The orifice 43 is defined by a central mandrel 44 retained in the passage 42 by a peripheral support spider 45 seated on a block shoulder 46 by a retaining collar 47. The extreme free upper end of the mandrel 44 is surrounded by an annular orifice collar 48. The mandrel 44 has a lower streamlined nose portion 49 depending below the spider 45 and a medial bulbous portion 50 which is radially enlarged into close fitting clearance in the passage 42 to provide a restricted flow passage 51 which, in effect, is interposed between the outlet end 26 of the screw 23 and the outlet orifice 43.

Positioned exteriorly of the annular outlet orifice 43 provided by the cylindrical terminal portion of the mandrel 44 and the surrounding cylindrical passage 42 are a pair of segmented blow mold sections indicated generally at 55. The blow mold sections 55 have interior walls 56 cooperatively defining a complete blow mold cavity. When closed (see FIGURE 4) the blow mold sections abut along parting lines 57 to define the blow mold cavity, and each section 55 has a lower pinching edge 58 for pinching shut an extruded tube to form a blowable bubble, in a manner to be hereinafter more fully described.

The upper portions of the blow mold sections 55 are provided with semicylindrical recesses 59 for cooperating with an upper neck mold assembly 60 which is movable vertically relative to the orifice 43. This neck mold 60 comprises an upper neck mold bock 61 having a central bore 62 through which projects a neck mold mandrel 63, provided with an axial air passage (not shown) and having a central, radially enlarged guide embossment 64. The neck of the container to be formed is defined by a pair of separable neck mold sections 65, laterally slidable along the guide embossment 64 for opening and closing movement, and having interior semicylindrical recesses 66 contoured to the exterior of a container neck and cooperating with the lower end of the neck mold mandrel 63 to define therebetween a neck mold recess 67. The structure of the neck mold 60 and of the blow mold sections 55, and the means for actuating such molds, are well known in the art, being generally as disclosed in United States Letters Patent No. 3,008,192, assigned to the assignee of the present invention.

*The operation of the embodiment of FIGURES 1–7*

As above explained, particulate plastic material 40 is supplied from the hopper 38 through the passage 39 to the barrel bore 22. Rotation of the screw 23 will advance this material along the screw flight 25 through the heated barrel 21. The heat supplied to the barrel, together with the pressure applied to the material by the decreasing depth of the screw flight 25, will reduce the material to a plasticized state as the material issues from the bulbous forward or exit end 26 of the screw.

Thus, a body of plasticized material, indicated generally at 70, will be provided in advance of the screw under a pressure determined by the characteristics of the screw and its rate of rotation by the gear 30. Such plasticized material freely communicates through the channel 42 with the annular orifice 43.

However, the small restricted space 51 created by the bulbous portion 50 of mandrel 44 and the surrounding member 46 is such that axial displacement of screw 23 is required in order to force viscous plasticized material through the restricted space. The pressure developed by rotation of the screw 23, absent axial motion thereof, is insufficient to force plasticized material through the restricted space 51. Consequently, there will be no flow of material from the body 70 beyond the restriction 51, even though there is no valve mechanism or the like isolating the body 70 from the outlet orifice 43. So long as the resistance provided by the restriction 51 is greater than the pressure generated within the body 70, there will be no dispensing of material through the orifice.

It will be recalled that the pressure within the body 70 is dependent upon the characteristics of the screw 23 and the amount of driving effort imparted to the screw by means of the gear train through the gear 30. In the vent that the screw is in its illustrated position of FIGURE 1, so that the maximum volume of material 70 has been accumulated at the desired pressure, the screw will merely stall out since it will be incapable of supplying material at a pressure in excess of the resistance of the restriction 51.

If now it is desired to dispense material through the orifice, as upon positioning the neck mold 60 at the orifice, fluid under pressure is introduced through the conduit 36 and the pressure passage 37 to urge the piston 33 to the left, thus advancing the screw 23 in the bore 22. Thus, the exertion of the outside pressure on the screw 23 will force material from the body 70 past the restriction 51, through the orifice and into the mold chamber 67 of the neck mold 60.

After filling of the neck mold 60, the neck mold is elevated from the orifice as the screw 23 is again advanced to the left to extrude a tube 71 (FIGURE 3) integral with material filling the neck mold 60. After the tube 71 has been extruded, the blow molds 55 are closed on the tube (FIGURE 4) with the pinching edges 58 of the blow mold shutting the tube exteriorly of the orifice to form a blowable bubble 72.

It will be recalled that during the dispensing of material through the orifice, the screw 23 was displaced to the left, so as to overcome the resistance afforded by the gap 51. When material is no longer desired to be expressed through the orifice, fluid under the relatively high dispensing pressure is no longer admitted through the conduit 36 and the passage 37, so that the piston 33 no longer urges the screw 23 to the left with sufficient force to pass the restriction 51. However, the screw 23 continues to rotate and to plasticize additional material, this material being discharged from the screw at a pressure less than that required to pass the restriction 51, but greater than any holding pressure exerted by the piston 33. Accordingly, the screw 23 is forced backward, or to the right, reaccumulating a body of material 70.

This reaccumulation of the body of material continues as the blown article is formed on the introduction of air under blowing pressure through the neck mold mandrel 63 into the pinched tube 72; during the retention of the blown article in the closed blow molds 55 to chill the blown portions to their final configuration, as indicated at 73 in FIGURE 5; and during the opening of the blow molds, as illustrated in FIGURE 6 of the drawings. The article is removed by upward displacement of the still closed neck molds (FIGURE 6 of the drawings) to displace the blown article 73 vertically, thereby removing from the orifice that portion 74 of the plasticized material lying intermediate the orifice and the restriction 51 (FIGURE 6) during the opening of the neck molds to release the article 72 with the integral waste portion 74.

Next, the neck mold 60 is repositioned at the orifice, and the steps of the method schematically illustrated in FIGURES 2 through 7 are again repeated, as above explained.

*The embodiment of FIGURE 8*

Another embodiment of the invention illustrated in FIGURE 8 of the drawings utilizes substantially the same structure with the exception of a different form of screw 80 disposed within the bore 81 of the barrel 82. The screw 80 has a generally cylindrical feed section 83, a frustoconical pressure section 84, and a generally cylindrical terminal metering section 85 terminating in a rounded bulbous nose 86. As before, pelletized or particulate plastic material is supplied from an overhead hopper 87, through a passage 88 to the bore 81. The screw is driven by means of a gear set, indicated generally at 89, and including a driven gear 90 connected to the drive shaft 91 of the screw by splines 92, the driven gear 90 meshing with a drive gear 93, driven by suitable power mover such as an electric motor 94. The screw shaft 91 is secured to a piston 95 axially displaceable in either direction by a surrounding, double-acting cylinder 96 which is adapted to receive fluid under pressure from a suitable source, by means of a fluid pressure conduit 96, 98 respectively.

The barrel bore 82 communicates through a joining block 99 with a material passage 100 which is curved to merge into a vertical recess 101 formed in a block 102. The vertical recess 101 is closed by a peripheral mounting block 103 positioning a central insert 104 so that a conical passage 105 thereof mates with the recess 101. An orifice block 106 is superimposed over the insert 104 and is retained in position, as by a set screw 107 so that in orifice passage 108 communicates with the conical passage 105.

Located interiorly of the passages 101, 105 and 108 is a mandrel 110 having a lower conical projection 111 depending from a cylindrical support section 112 secured by radial struts 113 to a surrounding support ring 114, positioned in a recess in the housing 102. The mandrel 110 is provided with an upper conical extension 115 projecting through the conical passage 105 and the upper passage 108, to terminate in an upper cylijndrical extremity 116 cooperating with the surrounding block 106 to define therebetween an annular extrusion surface 117 cooperating with the passage 108 to define an annular extrusion orifice 120.

*The operation of the embodiment of FIGURES 8 through 13*

The previously described embodiment of the invention illustrated in FIGURE 8 of the drawings is adapted to be utilized in conjunction with a neck mold 60 and blow molds sections 55 identical with those previously described in connection with the embodiment of FIGURES 1 through 7.

As the screw 80 is rotated, a body of plasticized material 126 is provided in advance thereof, such material generally being accumulated when the screw 80 is in an extreme righthand position, fluid pressure being introduced through the conduit 98 to displace the piston 95 to the right within the cylinder 96.

When the screw 80 is in such a position, the neck mold 60 is lowered into registry with the orifice 117, fluid under pressure is introduced into the cylinder 96 through the fluid line 97 and the piston 95 is advanced to the left to move the screw toward its illustrated position of FIGURE 8. Thus, plasticized material from the body 126 is expressed through the passage 100, and the passages 101 and 105 to the mandrel passage 108, and then outwardly through the orifice 120, into the neck mold recess 67.

When the neck mold recess is filled, as illustrated in FIGURE 9 of the drawings, the neck mold is moved away from the orifice and the tube 121 is extruder (FIGURE 10), the material forming the extruded tube 121 being displaced through the orifice 120 as the screw 80 is advanced further to the left, as will be readily seen by a comparison of FIGURES 9 and 10.

After the tube 121 has been extruded, the blow mold sections 55 are closed on the tube to pinch the same shut, thus forming the blowable bubble 122, as illustrated in FIGURE 11 of the drawings. At this time, the screw 80 is retracted to the right, by disconnecting the conduit 97, from the source of fluid under pressure and connecting the conduit 98 to such source of fluid pressure. By so pulling the extruder screw 80 to the right, the plasticized material interposed between the screw and the orifice is pulled downward into the orifice and therebeneath, because of the sudden retraction of the screw. It is not necessary that, but is preferred that, some plasticized material remain in the orifice itself. This is necessarily so because the chilled surfaces of the blow molds contacting the tube will tend to somewhat solidify the plasticized material immediately exterior of the orifice and immediately at the orifice itself. Consequently, the solid stream of plasticized material, illustrated in FIGURES 9 and 10, will be broken somewhere beneath the orifice, and the remainder of the material will be pulled back or "sucked" into the passage 100 and into the barrel 81 immediately in advance of the leading end 86 of the screw. As a result, there will be an open or unfilled space 123 intermediate the screw 80 and the orifice 120, the size or rather the volume of this space 123 depending upon the extent to which the screw 80 is retracted.

As the blow molding operation continues exteriorly of the orifice 120, as illustrated in FIGURES 9 through 13, the screw 80 continues to rotate and additional plasticized material is supplied in advance of the screw under a pressure dependent upon the screw characteristics and the speed at which the screw is driven, as above explained. This material will again reconstitute the body 126 of plasticized material and the space 123 between the accumulated body of material and that material filling the orifice 120 will gradually decrease in volume. However, prior to the complete filling of the space 123, the blow molds 55 are opened as illustrated in FIGURE 12 of the drawings; the neck mold 60 is actuated away from the orifice 120, as shown in FIGURE 13 of the drawings; and that waste portion 124 previously occupying the orifice is removed therefrom integrally with the blow molded container 125. After opening of the separable neck mold sections and removal of the bottle, the neck mold is again positioned over the orifice 120 and the sequence of steps illustrated in FIGURES 9 through 13 is again initiated by actuating the screw cylinder 95 by fluid pressure introduced through the conduit 97.

The embodiment of FIGURE 14 of the drawings

As illustrated in FIGURE 14 of the drawings, an additional embodiment of the present invention conforms substantially to that illustrated in FIGURE 8 of the drawings, with the exception of the screw, indicated generally at 130. Identical reference numerals in the embodiments of FIGURES 8 and 14 identify identical portions of the overall apparatus.

The screw 130 comprises a first, relatively long, substantially cylindrical feed portion 131, a relatively short, generally frusto-conical pressure section 132, and a generally cylindrical metering section 133, the portions 131, 132 and 133 all being circumscribed by a helical flight 135 of substantial constant lead and of varying depth.

The terminal free end of the screw 130 is provided with a bulbous, radially enlarged embossment 136 projecting beyond the end of the screw flight 135, and having a partially hemispherical outer surface 137 of an exterior diameter such that it is closely spaced from the interior wall of the barrel bore 81 through a dimension indicated generally at 138. The forward face 139 of the terminal portion 136 is substantially planar and lies radial to the axis of rotation of the screw.

As the screw 130 is rotated by the gearing 89, the pelletized or particulate material is advanced therealong by the screw flight 135 and is pressurized by the screw flight, and particularly by the pressure portion 132 of the screw. The pressure exerted on the material by the screw 130 causes pressurized material to pass through the restricted annular passage 138, the pressure required for passage therethrough being relatively great because of the restriction. The "pressure drop" across the restriction 138 causes the material interposed between the leading end 139 of the screw and the orifice 120 to be at a pressure substantially less than the pressure normally generated by the screw and, in this manner, a body of plasticized material, corresponding to the body 126 in the embodiment of FIGURES 9 through 13, will be established and maintained in advance of the screw at a pressure substantially less than normal output pressure of a screw having the other characteristics of the screw 130 but without the bulbous end 136.

Additionally, the bulbous end 136 of the screw 130 and particularly the planar end face 139 thereof can effectively exert pressure upon this body of material upon actuation of the screw to the left by the cylinder 96, without reference to the pressure generated by the screw 130 due to the rotation. Thus, the terminal portion of the screw itself can serve as a restriction to prevent the issuance of material through the orifice 120, so long as the pressure required to issue material is greater than the pressure of the accumulated material.

Summary

Thus, it will be seen that the present invention provides several different forms of apparatus and two distinct methods of operation whereby plasticized, heat sensitive thermoplastic material can be supplied to a forming orifice for subjection to a forming operation exterior to the orifice. Such material is issued through the orifice intermittently and in such manner that thermal degradation of the material and the generation of gaseous degradation products is avoided.

The basic concept of the present invention is the accumulation of heat sensitive thermoplastic materials in a plasticized condition in full communication with a dispensing orifice, thereby avoiding overlong residence times at the plasticizing temperature, avoiding the necessity of providing an off-on valve for controlling the flow of material through the orifice, and avoiding any trapping or other formation of "blind spots" in the supply path to the forming orifice.

By utilizing the embodiment of FIGURE 1, capable of carrying out the methods of FIGURES 1 through 7, the material is accumulated at a pressure determined by a restriction in the flow path of the plasticized material to the orifice, the resistance of the restriction being in excess of the pressure at which the accumulated material is stored. The accumulated material is subjected to an external pressure, i.e., by axial displacement of the screw, to elevate the pressure of the accumulated material to a value in excess of the resistance of the restriction, in order that material may be dispensed through the orifice for a forming operation.

In the embodiment of FIGURE 8, and in accordance with the method of FIGURES 8 through 13, the plasticized material is accumulated in advance of a screw which can be positively displaced away from the orifice, so that an unfilled space is provided intermediate the screw and the orifice while a forming operation is taking place exteriorly of the orifice, this unfilled space being progressively filled with plasticized material as such plasticized material is reaccumulated.

By the operation of either method, the accumulation of material is accomplished without utilization of any valving mechanism.

The screw specifically disclosed in FIGURE 14 has a "built in" pressure drop accommodating the accumulation of material in advance of the screw at a pressure substantially less than that generated during the plasticizing action of the screw. So long as the accumulation of material is accomplished at a pressure less than the pressure required for issuance of material through the orifice, no such issuance will occur.

While one exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

We claim:
1. In a method of making an article from thermoplastic material by a combined injection molding, extrusion and blowing technique, the steps of (1) plasticizing thermoplastic material in a screw type plasticizer having a screw rotatable and axially displaceable in a tubular barrel freely communicating with an outlet orifice to provide a body of plasticized material communicating through a passage with the orifice, said body being maintained at a first pressure by rotation of said screw, (2) interposing a restriction in said passage without blocking said passage, said restriction being small enough that axial movement of said screw is required in order to force plasticized material through said restriction, the first pressure generated by rotation of said screw being insufficient to force the plasticized material through said restriction, (3) advancing said screw axially in said barrel to subject said body of plasticized material to a second pressure greater than said first pressure and sufficient to force plasticized material from said body through said restriction and said orifice into an injection mold positioned at said orifice, (4) simultaneously moving the mold from the orifice and further advancing the screw to extrude a tube integral with the material in the mold, (5) closing a blow mold on said tube to pinch the tube shut exteriorly of said orifice, (6) introducing air into the pinched tube to inflate the tube interiorly of the blow mold, (7) during the performance of steps 5 and 6 above retracting the screw in said barrel and rotating the screw to again accumulate a body of plasticized material communicating with said passage, (8) opening the blow mold and removing the blown article therefrom, and (9) performing step 3 above to reinstitute a forming cycle.

2. In a method of making an article from a thermoplastic material by a combined injection molding, extrusion and blowing technique, the steps of (1) plasticizing thermoplastic material in a screw type plasticizer having a screw rotatable and axially displaceable in a tubular barrel freely communicating with an outlet orifice to provide a body of plasticized material communicating through a passage with the orifice, the passage having a restriction therein and said body of material normally being maintained by rotation of said screw at a first pressure insufficient to express plasticized material through said restriction and out of said orifice, (2) advancing said screw axially toward said orifice to subject said body of plasticized material to a second pressure greater than said first pressure and sufficient to express plasticized material through said restriction and out of said orifice and into an injection mold positioned at the orifice, (3) simultaneously moving the mold from the orifice and further advancing the screw to extrude a tube integral with material in the mold, (4) closing a blow mold on said tube to pinch the tube shut exteriorly of the orifice, (5) introducing air into the pinched tube to inflate the tube interiorly of the blow mold, (6) during the performance of steps 4 and 5 above, retracting the screw in the barrel in a direction away from the orifice and rotating the screw to again accumulate a body of plasticized material at said first pressure and in full communication with said orifice, (7) opening the blow mold and removing the blown article therefrom, and (8) performing step 2 above to reinstitute a forming cycle.

3. In a method of making an article from a thermoplastic material expressed through a restricted outlet orifice, the steps of (1) plasticizing a body of thermoplastic material in a screw type plasticizer having a screw rotatable and axially displaceable in a tubular barrel freely communicating through a passage with the orifice, said body being subjected to a first pressure by rotation of said screw, (2) interposing a restriction in said passage without blocking said passage, said restriction being such that axial movement of said screw is required in order to force plasticized material from said body through said restriction, the first pressure generated by rotation of said screw being insufficient to force the plasticized material through said restriction, (3) advancing said screw axially in the barrel to subject said body of plasticized material to a second pressure greater than said first pressure and sufficient to express a desired amount of material through said restriction and out of said orifice, (4) when the desired amount of material has been expressed through said orifice, halting the advance of said screw to terminate the expression of material through said orifice, and (5) retracting the screw in said barrel in a direction away from the orifice and rotating the screw to again accumulate a body of plasticized material freely communicating with said orifice and at said first pressure, preparatory to again performing step 3 above.

References Cited

UNITED STATES PATENTS

| | | | |
|---|---|---|---|
| 3,001,233 | 9/1961 | Ernst | 18—30 |
| 3,008,192 | 11/1961 | Allen | 264—97 |
| 3,140,332 | 7/1964 | Brown | 264—329 |
| 3,146,282 | 8/1964 | Ninneman | 264—328 |
| 3,163,693 | 12/1964 | Stenger | 264—329 |

FOREIGN PATENTS

| | | |
|---|---|---|
| 1,150,189 | 1/1958 | France. |
| 1,276,593 | 10/1961 | France. |

ROBERT F. WHITE, *Primary Examiner.*

ALEXANDER H. BRODMERKEL, *Examiner.*

R. B. MOFFITT, *Assistant Examiner.*